UNITED STATES PATENT OFFICE.

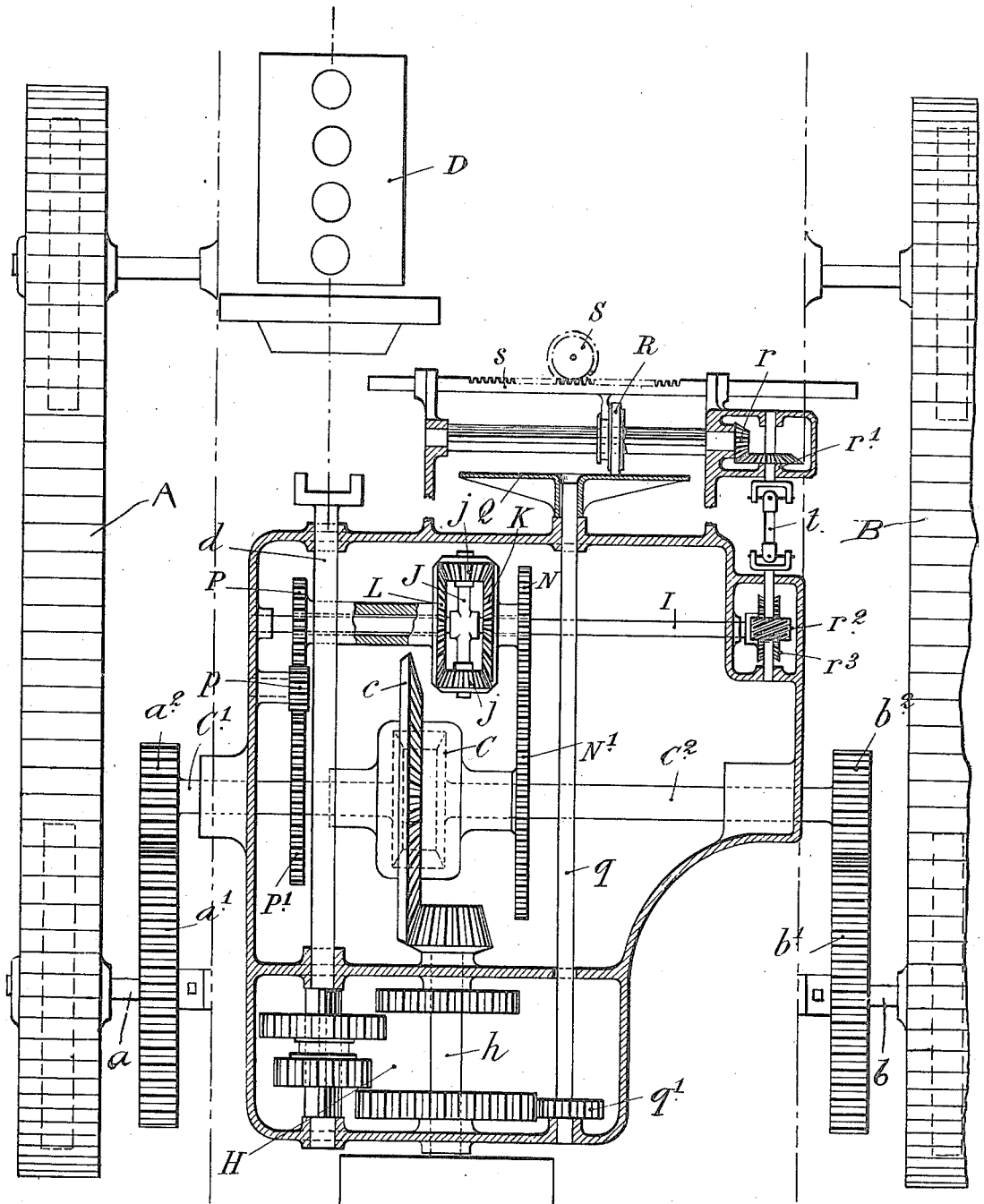

EUGÈNE SCHNEIDER, OF LE CREUZOT, FRANCE.

POWER-TRANSMITTING AND STEERING MECHANISM FOR CATERPILLAR-TRACTORS.

1,247,725.     Specification of Letters Patent.     Patented Nov. 27, 1917.

Application filed December 28, 1915. Serial No. 69,103.

*To all whom it may concern:*

Be it known that I, EUGÈNE SCHNEIDER, a citizen of the Republic of France, residing at Le Creuzot, France, have invented a new and useful Improvement in Power-Transmitting and Steering Mechanism for Caterpillar-Tractors, which is fully set forth in the following specification.

This invention has for its object to provide an improved power-transmitting and steering mechanism which is designed more particularly for use in motor vehicles fitted with endless track belts composed of elements which are movably jointed together and serve as track rails for the rolling and propelling apparatus of the vehicle. These toothed track belts are known as, and are referred to hereinafter as "caterpillar tracks."

The known vehicles of this kind are steered in one or the other of the two following ways:

1. The vehicle comprises front wheel steering gear, and the steering and turning movements are effected in the same manner as in the case of an ordinary motor vehicle. The drawbacks of that known system are the following:—1. It entails the use of a road wheel steering gear; while, as a consequence of the great adhesion of the caterpillar tracks to the ground, the vehicle steers badly, and turns slowly with side slipping of the steering road wheels.

2. The caterpillar tracks are independently driven. The disconnection of one of the tracks from its drive causes a diminution of one-half of the adhesion of the vehicle, so that the turning movements of the vehicle will cause a slipping of the caterpillar track that has alone remained driving.

Now the present invention has for its object to do away with all the above stated drawbacks.

In order that the invention may be more readily understood, reference is had to the accompanying drawing in which is shown a diagrammatic plan view illustrating, by way of example, one constructional form embodying my invention.

As shown in the drawing, the power-transmitting and steering mechanism comprises the usual differential C between the two caterpillar tracks A, B, but the steering gear comprises an interpolated auxiliary apparatus which allows of varying the relative speed of the two pinions $a^2$, $b^2$ which actuate the shafts $a$, $b$ driving the caterpillar tracks.

The shafts $a$, $b$ driving the two caterpillar tracks are respectively connected by gears $a^1$—$a^2$, $b^1$—$b^2$ to the differential C, the case of which carries a bevel wheel $c$ driven in the usual manner from the motor D, through the medium of the main driving shaft $d$ and a change speed and driving gear H.

According to the invention, a shaft I fixed to a cross-shaped member J on which satellite pinions $j$ are journaled, is arranged parallelly to the axis of the differential. These satellites engage pinions K and L which are fixed respectively to toothed wheels N and P that are loose as regards the shaft I. The entire arrangement constitutes an auxiliary differential.

The wheel N engages directly a wheel $N^1$ fixed on the short shaft $C^2$. The wheel P engages through a reversing pinion $p$, a wheel $P^1$ fixed on the short shaft $C^1$. The ratio between the numbers of teeth of the wheels N and $N^1$ is the same as the ratio between the wheels P and $P^1$.

The function of the auxiliary mechanism is as follows: Assuming the vehicle is traveling in a straight line, the speeds of the shafts $C^2$ and $C^1$ will be equal, and consequently the speeds of the wheels $N^1$ and $P^1$ for instance will also be equal.

Owing to the equality of the speed ratios the wheels N and P will likewise revolve at equal speeds, but in opposite directions as a result of the interpolation of the pinion $p$. Under such conditions however the satellites $j$ will rotate on the cross member J which remains stationary as does likewise the shaft I.

Vice versa, if the shaft I is caused to be stationary, the vehicle will continue to travel in a straight line.

If however rotation is imparted to the shaft I, the satellites $j$ will carry the movable wheels N and P around in the same direction, and these wheels will drive the wheels $N^1$ and $P^1$ around in opposite directions; owing to the action of the differential C these two relative rotational movements will be equal in relation to the wheel $c$. If rotation is imparted to the shaft I while the vehicle is traveling, the respective speeds of the shafts $C^2$ and $C^1$ will be the resultants of the speed of the wheel $c$ (driven by the motor and the gear H) and of the positive and negative speeds imparted to the wheels N¹ and P¹ by the auxiliary differential.

Let V be the speed of the shafts C¹—C² driven by the motor and the differential C, and $v$ be the positive or negative complementary speed imparted to the wheels N¹ and P¹ by the rotation of the shaft I; then the speed of the shaft C¹ for instance will be: V+$v$, and that of the shaft C² will be: V—$v$. Owing to the resulting difference in speed of the pinions $a^2$, $b^2$, the vehicle will make a turning movement having as its center a point situated on the outside of the pinion $b^2$ in that case.

The direction of the turning movement and its radius are therefore functions of the direction and speed of the rotational movement imparted to the shaft I.

The shaft I may be rotated by any suitable means, such for example as that shown in the drawings. This mechanism comprises a friction disk Q driven by a shaft $q$ which is driven in its turn through the pinion $q^1$ from the mechanism H. The disk Q imparts to the roller R a rotational movement having a direction and speed which are functions of the position of the roller R in relation to the center of the disk Q.

The position of the roller R is controlled by the ordinary hand steering wheel (not shown) adapted to actuate a pinion S that drives a rack $s$ the movement of which serves to shift the roller R across the face of the disk Q. The roller R transmits its rotary motion to the shaft I for instance through pinions and worm gear ($r$—$r^1$ and $r^2$—$r^3$), and if necessary a Cardan coupling $t$.

The disk Q is preferably formed with a central recess designed to avoid permanent frictional contact of the roller R while the vehicle is traveling in a straight line. The roller R may be kept in that position by means of a light brake (not shown).

A hydraulic transmission arranged for instance directly between the shaft $h$ of the mechanism H and the shaft I, might be used instead of the friction drive shown.

Having now described my invention, what I claim as new and desire to secure by Letters Patent is:—

1. In a power-transmitting and steering mechanism, in combination with the driving gears, a differential, connections between said differential and said gears respectively, and an auxiliary differential operatively connected with said first differential.

2. In a power-transmitting and steering mechanism, in combination with the driving gears, a differential, connections between said differential and said gears respectively, an auxiliary differential, and connections between said auxiliary differential and said first-mentioned connections respectively.

3. In a power-transmitting and steering mechanism, in combination with the driving gears, a differential, connections between said differential and said gears respectively, an auxiliary differential, gearing between one part of said auxiliary differential and one of said connections adapted to rotate said connection in one direction, and gearing between another part of said auxiliary differential and another of said connections, said second-mentioned gearing being adapted to rotate its corresponding connection in the opposite direction.

4. In a power-transmitting and steering mechanism, in combination with the driving gears, a differential, connections between said differential and said gears respectively, an auxiliary differential, connections between said auxiliary differential and said connections respectively, and a controlling device for said auxiliary differential.

5. In a power-transmitting and steering mechanism, in combination with the driving gears, a differential, connections between said differential and said gears respectively, an auxiliary differential, connections between said auxiliary differential and said connections respectively, and a controlling device for said auxiliary differential, said controlling device comprising motor-driven means and manually-movable means driven by said motor-driven means and operatively connected with said auxiliary differential.

6. In a power-transmitting and steering mechanism, in combination with the driving gears, a differential, connections between said differential and said gears respectively, an auxiliary differential, connections between said auxiliary differential and said connections respectively, and a controlling device for said auxiliary differential, said controlling device comprising motor-driven means and laterally-shiftable, rotatable means driven by said motor-driven means and operatively connected with said auxiliary differential.

7. In a power-transmitting and steering mechanism, in combination with the driving gears, a differential, connections between said differential and said gears respectively, an auxiliary differential, connections between said auxiliary differential and said connections respectively, and a controlling device for said auxiliary differential, said controlling device comprising a motor-driven friction disk and a laterally-movable friction wheel operatively connected with said auxiliary differential.

8. In a power-transmitting and steering mechanism, in combination with the driving gears, a differential, connections between said differential and said gears respectively, means for either increasing or decreasing the speed of rotation of either of said connections and respectively decreasing or increasing the speed of rotation of the other of said connections, and a controlling device for said means comprising a motor-driven friction disk and a laterally-shiftable friction wheel operatively connected with said first-mentioned means.

9. In combination, caterpillar tracks, driving gears therefor, and steering mechanism comprising a differential, gearing between one part of said differential and one of said gears adapted to rotate such gear in one direction, and gearing between another part of said differential and another of said gears adapted to rotate the latter gear in the opposite direction.

10. In combination, caterpillar tracks, differentially connected driving gears therefor, supplemental differential means having gear connections with each of said driving gears to rotate the latter in opposite directions, and manually controlled motor-driven means for operating said supplemental differential.

In testimony whereof I have signed this specification in the presence of two subscribing witnesses.

EUGÈNE SCHNEIDER.

Witnesses:
   CHAS. P. PRESSLEY,
   G. T. WADLEY.